(12) United States Patent
Ide et al.

(10) Patent No.: US 6,380,655 B1
(45) Date of Patent: Apr. 30, 2002

(54) VARIABLE-SPEED ELECTROMECHANICAL ENERGY CONVERTER

(75) Inventors: Kazumasa Ide, Hitachiohta; Miyoshi Takahashi, Hitachi; Mamoru Nemoto, Hitachinaka; Seiji Takahashi, Handa, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/463,619

(22) PCT Filed: Nov. 20, 1998

(86) PCT No.: PCT/JP98/05246

§ 371 Date: Jan. 28, 2000

§ 102(e) Date: Jan. 28, 2000

(87) PCT Pub. No.: WO00/31857

PCT Pub. Date: Feb. 6, 2000

(51) Int. Cl.[7] .................. H02K 17/16; H02K 17/22; H02K 19/14

(52) U.S. Cl. ................. 310/211; 310/181; 310/198; 310/199; 310/212; 310/266; 318/727

(58) Field of Search ................. 310/181, 198, 310/199, 211

(56) References Cited

U.S. PATENT DOCUMENTS

| 4,473,752 A | * | 9/1984 | Cronin ................ 290/38 R |
| 5,723,928 A | * | 3/1998 | Imai et al. ............ 310/114 |
| 5,793,136 A |   | 8/1998 | Redzic ............... 310/114 |

FOREIGN PATENT DOCUMENTS

| DE | 40 23 791 A | 1/1992 |
| FR | 725 532 A | 10/1931 |

* cited by examiner

*Primary Examiner*—Elvin Enad
(74) *Attorney, Agent, or Firm*—Antonelli, Terry, Stout & Kraus, LLP

(57) ABSTRACT

A variable-speed electromechanical energy converter includes a wound-type induction motor and a power rectifier connected to a secondary winding of the motor to convert AC power produced by the motor into DC power. A chopper is connected to an output of the power converter to control the output thereof according to a control signal and a capacitor is connected through a rectifier device to the chopper. A power inverter converts DC power stored in the capacitor into AC power which is fed back to an AC system connected to the motor. The motor includes a cage rotor disposed between a wound rotor and a rotor shaft, the cage rotor being separated from the rotor shaft by an inner gap and separated from the wound rotor by a middle gap so as to rotate independently of the rotor shaft.

4 Claims, 3 Drawing Sheets

VARIABLE-SPEED ELECTROMECHANICAL ENERGY CONVERTER

TECHNICAL FIELD

The present invention relates to a wound-type induction machine and a variable-speed electromechanical energy converter employing the same.

BACKGROUND OF THE INVENTION

A conventional wound-type induction machine comprises a rotor formed by fitting an insulated winding (secondary winding) in circular or square, semiclosed or open slots formed in a laminated core formed by laminating silicon steel sheets or a solid core, and a stator formed by fitting an insulating winding (primary winding) in circular or square, semiclosed or open slots formed in the circumference of a laminated core formed by laminating silicon steel sheets and spaced by a gap from the rotor.

Japanese Patent Laid-open No. Sho 63-43598 discloses a variable-speed electromechanical energy converter having an exciter, such as a cycloconverter or a combination of an inverter and a converter, connected to a terminal which is connected through a sliding mechanism, such as a slip ring mechanism, to the secondary winding of a conventional wound-type induction machine.

Japanese Patent Laid-open No. Hei 7-213098 discloses a variable-speed power generating system having an ac system connected to the primary side of the induction generator, and a power rectifier comprising diodes connected to the secondary side of the induction generator, as well as a method of controlling the power generation of the induction generator under the control of the secondary current.

Japanese Patent Laid-open No. Hei 4-334953 discloses an induction motor comprising a stator provided with a stator winding, a first cage rotor provided with a second stator winding, conductors and a rotor shaft, and a second cage rotor provided with conductors and a rotor shaft separate from that of the first cage rotor and disposed coaxially with the first cage rotor.

Japanese Patent Laid-open No. Hei 8-103058 discloses an induction motor comprising a stator provided with a stator winding, a cage rotor provided with secondary conductors and fixedly mounted on a shaft, and a permanent-magnet rotor provided with permanent magnets and rotatably supported on a shaft and disposed coaxially with the first cage rotor.

SUMMARY OF THE INVENTION

The conventional technique needs, as an exciter to be connected to the secondary winding of a wound-type induction machine, a power converter capable of controlling the phase angle and the frequency of excitation voltage to be applied to the secondary winding, such as a cycloconverter or an inverter. Moreover, the power converter is expensive and the control method is complicated because the waveforms of voltage applied to and a current supplied to the secondary winding must be sinusoidal waveforms having little harmonic content to prevent the distortion of the primary current, and the main circuit of the power converter employs a switching device capable of optionally determining on-off timing.

Accordingly, it is an object of the present invention to provide a wound-type induction machine which is capable of generating electric power of a satisfactory quality having an output voltage with a reduced distortion.

Another object of the present invention is to provide a variable-speed electromechanical energy converter comprising a wound-type induction machine and a power converter, having a small construction and providing an output including less harmonic content.

According to one aspect of the present invention, a wound-type induction machine comprises a wound stator, a wound rotor disposed inside of the wound stator and fixed to a rotor shaft disposed in alignment with the center of rotation of the wound stator, and a cage rotor disposed between the wound rotor and the rotor shaft.

Even if the current flowing through the secondary winding of the wound stator has a harmonic content, the harmonic content of the current flowing through the secondary winding is attenuated and the harmonic content included in the ac power regenerated from the secondary winding in the ac system connected to the primary winding can be reduced because an induced current flows through the conductors of the cage rotor so as to nullify the revolving magnetic field created in the wound rotor by the harmonic content included in the current flowing through the secondary winding. Since the harmonic content of the current flowing through the secondary winding is attenuated, a current induced in the primary coil by the harmonic content of the current flowing through the secondary winding can be reduced. Therefore, even if the current flowing through the secondary coil has a harmonic content, the distortion of the current flowing through the primary winding can be reduced. Consequently, the outflow of harmonic power from the variable-speed electromechanical energy converter can be suppressed and good-quality electric power of an output voltage that is not distorted significantly can be generated.

According to another aspect of the present invention, a variable-speed electromechanical energy converter employs a wound-type induction machine comprising a wound stator, a wound rotor disposed inside of the wound stator and fixed to a rotor shaft disposed in alignment with the center of rotation of the wound stator, and a cage rotor disposed between the wound rotor and the rotor shaft.

Even if a high-frequency current generated by a power rectifier flows through the secondary winding, a harmonic content included in the current flowing through the secondary winding is attenuated because an induction current flows through the conductors of the cage rotor so as to nullify a revolving magnetic field created in the wound rotor, and the harmonic content included in the ac power regenerated in an ac system connected through the secondary winding, the power rectifier, a chopper, a capacitor and an inverter to the primary winding can be reduced. Since the harmonic content included in the current flowing through the secondary winding is attenuated, a current induced in the primary winding by the harmonic content of the current flowing through the secondary winding can be reduced. Accordingly, the distortion of the current flowing through the primary winding can be reduced even if the current flowing through the secondary winding has a harmonic content, the outflow of harmonic power from the converter can be suppressed, and good-quality electric power of an output voltage that is not distorted significantly can be generated.

The variable-speed electromechanical energy converter of the present invention employs a diode rectifier, or one chopper and a regenerative inverter as the power rectifier. Therefore, even though the converter is simple in configuration and inexpensive, good-quality electric power of an output voltage that is not distorted significantly can be generated.

When the number of the conductors of the cage rotor is greater than the number of the slots in which the primary winding of the wound stator is fitted, leakage reactance of the cage rotor is far lower than that of the primary winding, and the current induced by a current of higher harmonics in the primary winding is far lower than the current induced in the conductors of the cage rotor. Therefore, the distortion of the current flowing through the primary winding by the current induced by the harmonic content can be reduced and good-quality electric power of an output voltage that is not distorted significantly can be generated.

When the cage rotor is provided with permanent magnets, magnetic flux in the machine increases due to the magnetic flux of the permanent magnets. Consequently, the exciting current component of the current flowing through the primary winding of the wound stator is supplemented, and magnetic flux is secured in the machine even if the gap length is great and efficient power generation is achieved. It is desirable when the number of the permanent magnets is equal to an integral multiple of the number of poles of the wound-type induction machine.

BEST MODE FOR CARRYING OUT THE INVENTION

First Embodiment

Figure 1:
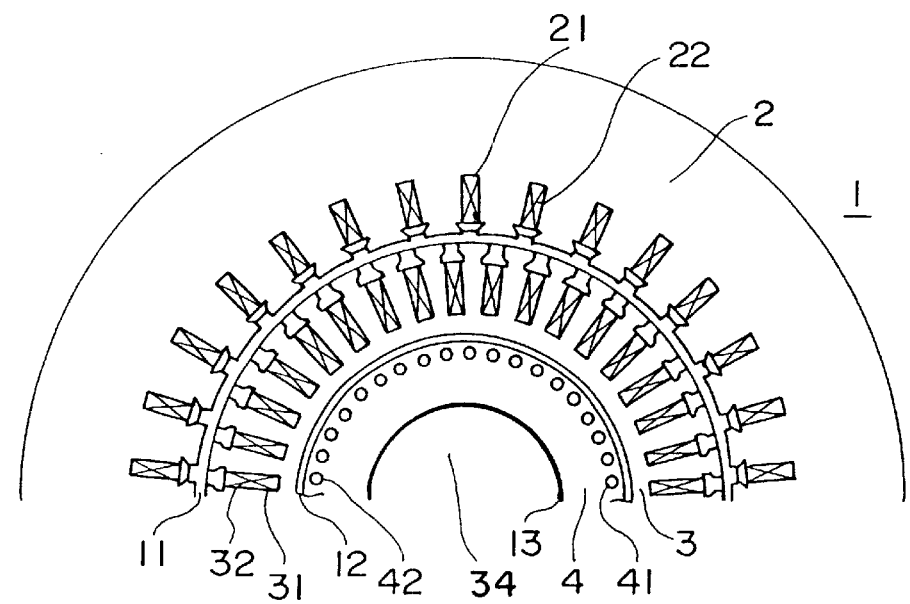
FIG. 1 is an axial cross sectional view of a wound-type induction machine a first embodiment according to the present invention.
Figure 2:
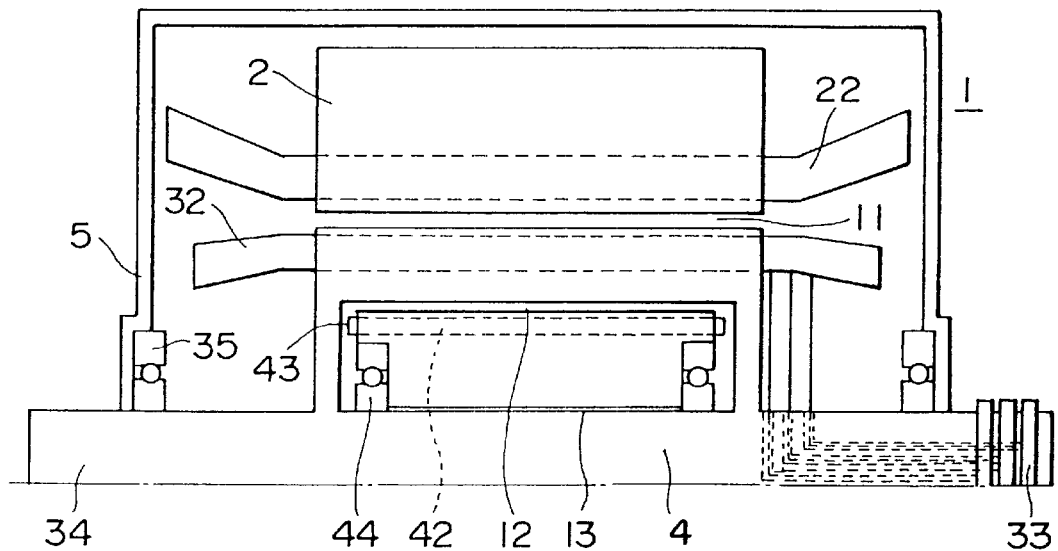
FIG. 2 is a longitudinal sectional view of the wound-type induction machine.

A wound-type induction machine 1 representing a first embodiment according to the present invention will be described. FIG. 1 is an axial cross sectional view of the wound-type induction machine 1 and FIG. 2 is a longitudinal sectional view thereof.

The wound-type induction machine 1 comprises a shaft 34, a cage rotor 4 mounted on and separated by an inner gap 13 from the shaft 34, a wound-type rotor 3 surrounding the cage rotor 4 so as to form a middle gap 12 between the cage rotor 4 and the wound-type rotor 3, a stator 2 surrounding the wound-type rotor 3 so as to form an outer gap 11 between the stator 2 and the wound-type rotor 3, and a frame 5 surrounding the stator. The shaft 34 is supported for rotation by support mechanisms 35, such as bearings, on the frame 5 of the wound-type induction machine 1.

The shaft 34 serves as an output shaft. The wound rotor 3 is connected to the shaft 34 for rotation together with the shaft 34. The cage rotor 4 is supported by support mechanisms 44, such as bearings, on the shaft 34 for rotation relative to the stator 2 and the wound rotor 3.

A primary winding 22 is fitted in semiclosed or open slots 21 formed in the stator 2. The primary winding 22 is a multiphase winding, such as a three-phase winding.

A secondary winding 32 is fitted in slots 31 formed in the wound rotor 3. The secondary winding 32 is connected to an external power source, not shown, by a feed means 33, such as slip rings.

Slots 41 are formed at equal angular intervals in the cage rotor 4 and conductive bars 42 are fitted in the slots 41. The conductive bars 42 may be either bare copper rods inserted in the slots 41 or cast aluminum bars. The opposite ends of the conductive bars 42 are connected electrically by short-circuit rings 43.

Figure 3:
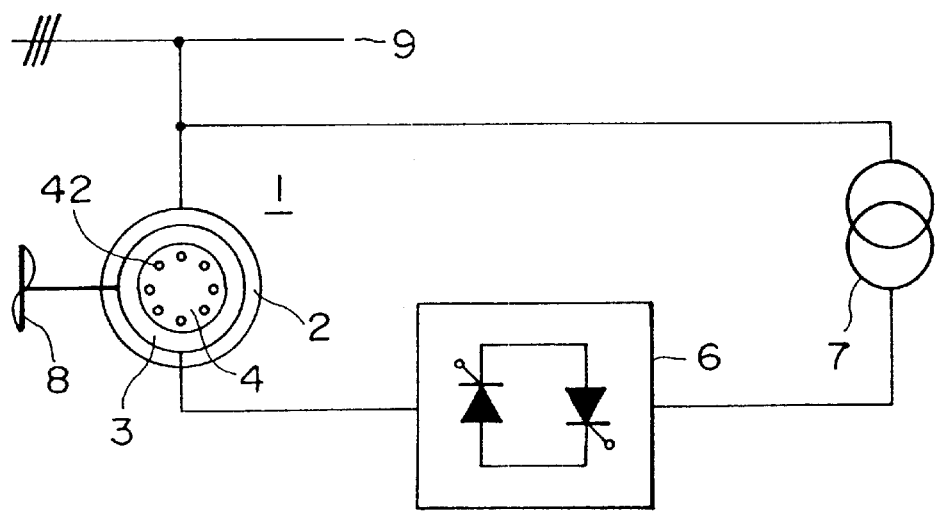
FIG. 3 is a diagrammatic view of a variable-speed electromechanical energy converter employing the wound-type induction machine.

As shown in FIG. 3, the shaft 34 of the wound-type induction machine 1 is connected mechanically to a prime mover (or a load). The primary winding 22 of the stator 2 is connected to an ac system 9. The secondary winding 32 of the wound rotor 3 is connected at a terminal thereof to an ac power supply of a slip frequency. In this embodiment, the ac power supply is a frequency converter 6 serving also as an ac power supply. The frequency converter 6 is connected to a transformer 7 connected to the ac system 9.

The frequency converter 6 is a cycloinverter or a combination of an inverter and a converter. The frequency converter 6 converts an alternating current of a slip frequency produced in the secondary winding 32 into an alternating current of the frequency of the ac system 9. The voltage of the frequency-converted alternating current is transformed by the transformer 7 and the alternating current is fed back to the ac system 9.

The prime mover 8 drives the wound rotor 3 for rotation at a rotating speed higher than the revolving speed of a revolving magnetic field created by the stator 2 by a speed corresponding to the slip frequency. The wound-type induction machine 1 operates as an induction generator to convert the mechanical energy of the prime mover 8 into electrical energy.

Description will be given of a magnetic field created in the wound-type induction machine 1 and a harmonic content included in the current flowing through the secondary winding 32 in a steady state in which the wound-type induction machine 1 is operating as a generator.

A current supplied from the ac system 9 to the primary winding 22 creates a revolving magnetic field in the stator 2. The cage rotor 4 in a no-load state rotates in synchronism with the revolving magnetic field created by the stator 2.

The waveform of the current flowing from the frequency converter 6 into the secondary winding 32 includes a harmonic content in addition to a slip frequency component.

A revolving magnetic field is created in the wound rotor 3 by a current of the slip frequency flowing through the secondary winding 32. This revolving magnetic field revolves in synchronism with the revolving magnetic field created in the stator 2. Since the cage rotor 4 rotates in synchronism with the revolving magnetic field created in the stator 2, the revolving magnetic field created in the wound rotor 3 by the current of the slip frequency is a dc magnetic field without a velocity relative to the cage rotor 4. Therefore, no current is induced in the conductive bars 42 of the cage rotor 4 by the revolving magnetic field created in the wound rotor 3 by the current of the slip frequency.

However, a revolving magnetic field created in the wound rotor 3 by a current of a frequency corresponding to the harmonic content of a current flowing through the secondary winding 32 is not synchronous with the revolving magnetic field created in the stator 2 and is an ac magnetic field having a velocity relative to the cage rotor 4. Therefore, an induced current flows in the conductive bars 42 of the cage rotor 4 so as to nullify the ac magnetic field. Consequently, a harmonic content included in the current flowing through the secondary winding 32 is attenuated, and the harmonic content included in the ac power fed back to the ac system 9 through the frequency converter 6 and the transformer 7 can be reduced.

The harmonic phenomenon in the stator 2 will be explained. The harmonic phenomenon in the stator 2 is based on the production of a harmonic induced current in the primary winding 22 of the stator 2 so as to nullify the ac magnetic field created by the harmonic content, so that a current is induced in the conductive bars 42 of the cage rotor 4 so as to nullify the ac magnetic field created by the harmonic content.

It is possible that the harmonic induced current induced in the primary winding 22 distorts the current flowing through the primary winding 22 and distorts the output voltage of the wound-type induction machine. Therefore, it is desirable for the harmonic induced current in the primary winding 22 to be less and to lessen the harmonic phenomenon in the stator 2 to supply good-quality power. As mentioned above, since the wound-type induction machine in this embodiment attenuates the harmonic content of the current flowing through the secondary winding 32, the harmonic induced current induced in the primary winding 22 of the stator 2 can be reduced.

The harmonic induced current induced in the primary winding 22 of the stator 2 can be reduced also by reducing the leakage reactance of the cage rotor 4. The sum of the distribution of the induced current flowing through the conductive bars 42 of the cage rotor 4 and that of the induced current flowing through the primary winding 22 of the stator 2 is substantially equal to the distribution of harmonic currents of frequencies other than the slip frequency flowing through the secondary winding 32 of the wound rotor 3. The ratio between the current flowing through the conductive bars 42 of the cage rotor 4 and the current flowing through the primary winding 22 of the stator 2 is substantially equal to the ratio between the reciprocal of the leakage reactance of the cage rotor 4 and the reciprocal of the leakage reactance of the primary winding 22. Thus, the lower the leakage reactance of the cage rotor 4, the smaller is the current flowing through the primary winding 22 of the stator 2.

In the wound-type induction machine 1 in this embodiment, the number of the conductive bars 42 of the cage rotor 4 is far greater than that of the slots 21 of the stator 2. Therefore, the leakage reactance of the cage rotor 4 is far smaller than the leakage reactance of the primary winding 22. Consequently, the harmonic induced current induced in the primary winding 22 of the stator 2 is far less than the induced current induced in the conductive bars 42 of the cage rotor 4, and so the distortion of the current supplied from the ac system 9 to the primary winding 22 of the stator 2 by the harmonic induced current can be reduced. Accordingly, good-quality electric power of an output voltage that is not distorted significantly can be generated.

Since the wound-type induction machine 1 in this embodiment is capable of attenuating the harmonic component of the current flowing through the secondary winding 32, a harmonic content included in the ac power fed back to the ac system 9 can be reduced and the harmonic current induced in the primary winding 22 of the stator 2 can further be reduced. Since the distortion of the current flowing through the primary winding 22 can thus be reduced, the outflow of harmonic power from the variable-speed electromechanical energy converter is suppressed and good-quality electric power of an output voltage that is not distorted significantly can be generated.

In this embodiment, the cage rotor 4 is supported on the shaft 34 by the support mechanisms 44. The cage rotor 4 may be disposed inside the wound rotor 3 and supported for rotation on the wound rotor 3 instead of extending the shaft 34 through the center of the cage rotor 4. When the cage rotor 4 is thus supported, friction between the shaft 34 and the support mechanisms 44 can be eliminated, and, hence, the wound-type induction machine generates power at an improved power generating efficiency.

In this embodiment, while the number of the conductive bars 42 is far greater than that of the slots 21 to reduce the leakage reactance of the cage rotor 4, the leakage reactance may be reduced by forming slits in portions of the conductive bars 42 on the side of the middle gap 12.

The wound-type induction machine 1 can be applied to various even-multipolar machines.

Second Embodiment

Figure 4:
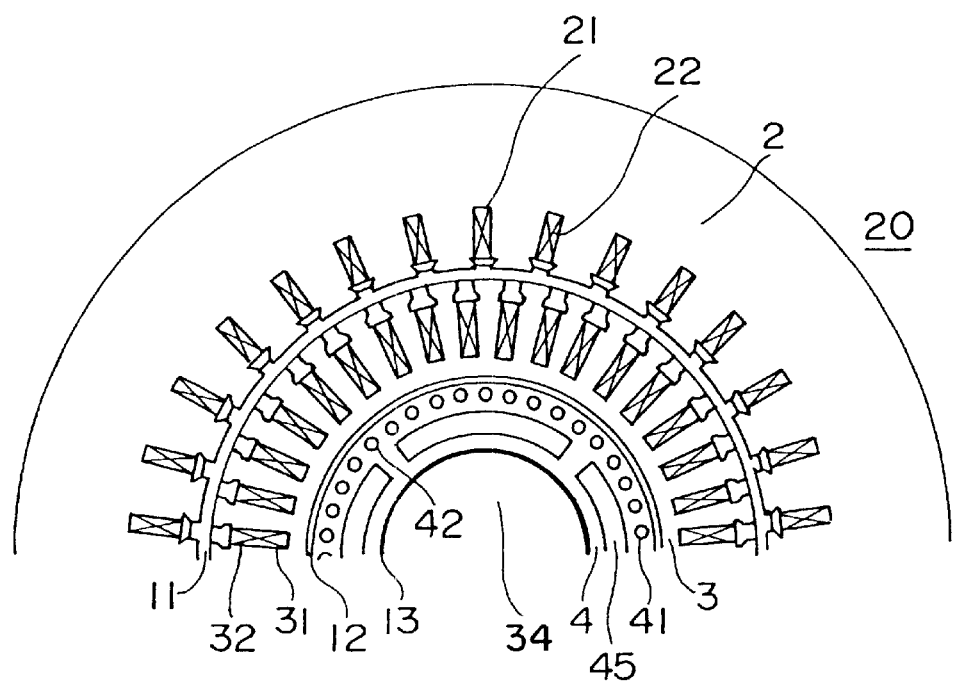
FIG. 4 is an axial cross sectional view of a wound-type induction machine representing a second embodiment according to the present invention.

A wound-type induction machine 20 in representing a second embodiment according to the present invention will be described. FIG. 4 is an axial cross sectional view of the wound-type induction machine 20.

The wound-type induction machine 20 in the second embodiment is similar in construction to the wound-type induction machine 1 in the first embodiment and differs from the wound-type induction machine 1 only in that a cage rotor 4 is provided with permanent magnets 45 embedded radially inward of the conductive bars 42. The number of the permanent magnets 45 is equal to the number of poles of the wound-type induction machine 20 or to an integral multiple of the number of poles. The shape and arrangement of the permanent magnets 45 are determined so that the equivalent current of the permanent magnets 45 is higher than a necessary exciting current for a middle gap 12.

The operation of the wound-type induction machine 20 is similar to that of the wound-type induction machine 1 in the first embodiment, and the wound-type induction machine 20 has the following effects. First, the relation between the gap between a stator and a rotor, and the fundamental component of a current that flows through the primary winding of the stator, will be explained.

The fundamental component of a current that flows through a primary winding 22 of a wound stator 2 included in the wound-type induction machine 20 includes an exciting current component necessary for producing a magnetic flux in the machine and a load current component for generating torque as an electric motor. The structure of the wound-type induction machine 20 needs a middle gap 12 to dispose a cage rotor 4 inside the wound rotor 3. Since the wound-type induction machine 20 has two gaps, namely, the middle gap 12 and an outer gap 13, between a stator 2 and the cage rotor 4, the total gap length of the wound-type induction machine 20 is greater than that of a wound-type induction machine provided with a single rotor. A wound-type induction machine having a greater gap length has a greater exciting current component and a lower power generating efficiency.

Since the wound-type induction machine 20 in the this embodiment has an additional magnetic flux corresponding to the magnetic flux created by the permanent magnets 45, the exciting current component of the current flowing through the primary winding 22 of the wound stator 2 is supplemented. Therefore, a magnetic flux can be created in the wound-type induction machine 20 in this embodiment even if the gap length is great and the wound-type induction machine 20 is able to generate power efficiently. Since the equivalent current of the permanent magnets 45 is higher than the desired exciting current for the middle gap 12, the effective exciting current for the primary winding 22 can be reduced, the magnetic flux intersecting conductive bars 42 included in the cage rotor 4 increases and the harmonic attenuating effect mentioned in connection with the description of the first embodiment can be enhanced.

Accordingly, the wound-type induction machine 20 in this embodiment is capable of efficient power generation and of generating good-quality power.

Third Embodiment

Figure 5:
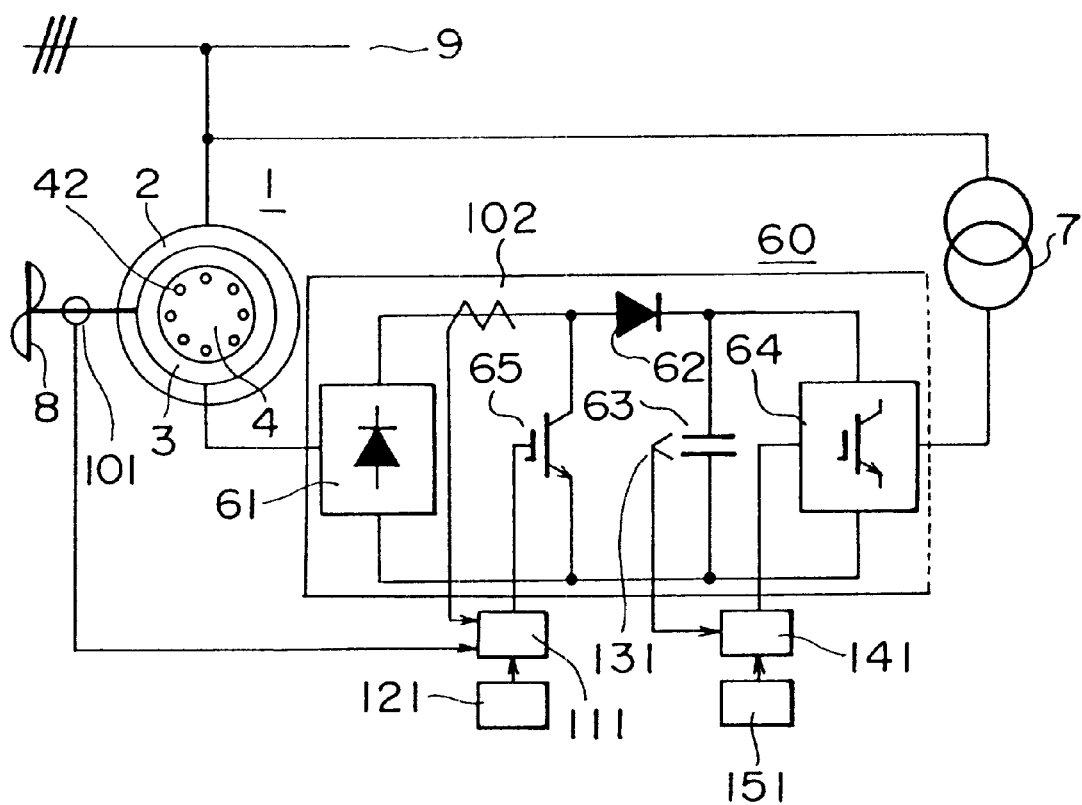
FIG. 5 is a diagrammatic view of a variable-speed electromechanical energy converter representing a third embodiment according to the present invention.

A variable-speed electromechanical energy converter in a third embodiment according to the present invention will be described. FIG. 5 shows the variable-speed electromechanical energy converter in this embodiment.

The variable-speed electromechanical energy converter in this embodiment employs the wound-type induction machine 1 in the first embodiment. The shaft 34 of the wound-type induction machine 1 is connected mechanically to a prime mover 8. The primary winding 22 of the stator 2 is connected to an ac system 9. A frequency converter 60 is connected to a terminal connected to the secondary winding of the wound rotor 3. The frequency converter 60 is connected to a transformer 7, and the transformer 7 is connected to the ac system 9.

The frequency converter 60 comprises a power rectifier 61 connected to the secondary winding 32 of the wound rotor 3, a reverse-blocking diode 62 connected to an output side of the power rectifier 61, a smoothing capacitor 63, a power inverter 64, a switching device 65 forming a secondary chopper, an ammeter 102 for measuring a current flowing through the secondary winding 32, and a voltmeter 131 for measuring a charging voltage applied to the smoothing capacitor 63. The power rectifier 61 is a diode rectifier for converting ac power generated in the secondary side of the wound-type induction machine 1 into corresponding dc power. The power inverter 64 comprises devices including a switching device and a diode. The switching device of the power inverter 64 is turned on and off to convert dc power into ac power. The voltage of ac power produced by the power inverter 64 is transformed by the transformer 7 and is fed back to the ac system 9. When the charging voltage of the smoothing capacitor 63 exceeds a predetermined value, the power stored in the capacitor 63 is fed back through the transformer 7 to the ac system 9.

A speed sensor 101 for measuring the rotating speed of the wound rotor 3 is connected to the shaft 34 of the wound-type induction machine 1. The variable-speed electromechanical energy converter further comprises an operational amplifier 111 connected to the speed sensor 101, the ammeter 102 and the switching device 65, and an operational amplifier 141 connected to the voltmeter 131 and the power inverter 64.

The operational amplifier 111 gives a switching signal to the switching device 65 serving as a chopper on the basis of the output signal of the speed sensor 101, the output of the ammeter 102 and a speed command signal 121. The output current of the power rectifier 61 and the current flowing through the secondary winding 32 of the wound-type induction machine 1 are controlled by the on-off operation of the switching device 65. Power generated by the wound-type induction machine 1 varies according to the rotating speed of the prime mover 8. The operational amplifier 111 controls the current flowing through the secondary winding 32 of the wound-type induction machine 1 so that the wound-type induction machine 1 operates at a maximum power generating rate.

The operational amplifier 141 gives a PWM control signal to the power inverter 64 according to the output signal of the voltmeter 131 and a voltage command signal 151.

When the wound-type induction machine 1 operates as a generator, the wave of the current flowing through the secondary winding 32 includes harmonics as described in the first embodiment. Since the power rectifier 61 employs a diode rectifier and does not employ any switching device, the frequency converter 60 generates the harmonics.

In the wound-type induction machine 1 of the first embodiment employed in this embodiment, a current is induced in the conductive bars 42 of the cage rotor 4 so as to nullify the revolving magnetic field created in the wound rotor 3 by the harmonic current flowing through the secondary winding 32. Therefore, the harmonic content of the current flowing through the secondary winding 32 is attenuated and a harmonic content included in the ac power fed back through the frequency converter 60 and the transformer 7 to the ac system 9 can be reduced. The harmonic current induced in the primary winding 22 of the stator 2 can be reduced similarly to the first embodiment.

Although the variable-speed electromechanical energy converter in this embodiment employs the simple frequency converter 60 employing a diode rectifier as the power rectifier 61 and the single switching device 65 as the chopper, the variable-speed electromechanical energy converter is capable of attenuating the harmonic content of the current flowing through the secondary winding 32, of reducing the distortion of the current flowing through the primary winding 22, of suppressing the outflow of harmonic power from the converter and of generating good-quality power.

The wound-type induction machine in accordance with the present invention is capable of reducing the distortion of the current flowing through the primary winding even if the current flowing through the secondary winding of the wound stator includes a harmonic content. Therefore, the outflow of harmonic power from the converter can be suppressed, and good-quality electric power of an output voltage that is not distorted significantly can be generated.

The variable-speed electromechanical energy converter in accordance with the present invention is capable of reducing the distortion of the current flowing through the primary winding even if a high-frequency current produced by the power rectifier flows through the secondary winding. Therefore, the outflow of harmonic power from the converter can be suppressed, and good-quality electric power of an output voltage that is not distorted significantly can be generated. Even though the converter has a simple, inexpensive configuration employing a diode rectifier as the power rectifier, a single chopper and a regenerative inverter, good-quality electric power of an output voltage that is not distorted significantly can be generated.

When the number of the conductive bars of the cage rotor is greater than that of the slots in which the primary winding of the wound stator is fitted, the distortion of the current flowing through the primary winding by harmonic induced current can more effectively reduced and good-quality electric power of an output voltage that is not distorted significantly can be generated.

The cage rotor provided with permanent magnets enables efficient power generation. It is desirable that the number of the permanent magnets be equal to an integral multiple of the number of poles of the wound-type induction machine.

The wound-type induction machine in accordance with the present invention is useful as an induction generator capable of generating good-quality electric power of an output voltage that is not distorted significantly, and is particularly suitable for application to a small variable-speed electromechanical energy converter from which significant outflow of harmonics does not occur.

What is claimed is:

1. A variable-speed electromechanical energy converter comprising:

a wound-type induction machine comprising a wound stator provided with a primary winding, a wound rotor provided with a secondary winding and disposed inside of the wound stator, and a rotor shaft fixed to the wound rotor;

a power rectifier connected to the secondary winding to convert ac power produced in the secondary winding of the wound rotor into dc power;

a chopper connected to a dc output side of the power converter to control a dc output of the power rectifier according to a control signal; and a capacitor connected through a rectifying device to the chopper in parallel connection; and a power inverter comprising a switching device for converting dc power stored in the capacitor into ac power to feed back the ac power to an system connected to the primary winding;

wherein a cage rotor provided with conductive members is disposed between the wound rotor and the rotor shaft;

said cage rotor being separated from said rotor shaft by an inner gap and separated from said wound rotor by a middle gap so as to rotate independently of said rotor shaft.

2. The variable-speed electromechanical energy converter according to claim 1, wherein the number of the conductive members of the cage rotor is greater than the number of slots in which the primary winding formed on the wound stator is fitted.

3. The variable-speed electromechanical energy converter according to claim 1, wherein the cage rotor is provided with permanent magnets.

4. The variable-speed electromechanical energy converter according to claim 1 wherein the cage rotor is provided with permanent magnets, and the number of the permanent magnets is equal to an integral multiple of the number of poles of the wound-type induction machine.

* * * * *